Aug. 21, 1923.

E. A. FRANCIS

GAUGE

Filed Dec. 17, 1919

1,465,920

WITNESSES

INVENTOR
E. A. Francis.
BY
ATTORNEYS

Patented Aug. 21, 1923.

1,465,920

UNITED STATES PATENT OFFICE.

EDGAR ARTHUR FRANCIS, OF MARSHALLTOWN, IOWA.

GAUGE.

Application filed December 17, 1919. Serial No. 345,488.

*To all whom it may concern:*

Be it known that I, EDGAR ARTHUR FRANCIS, a citizen of the United States, and a resident of Marshalltown, in the county of Marshall and State of Iowa, have invented a new and Improved Gauge, of which the following is a full, clear, and exact description.

It is well known that the ordinary automobile mechanic and car operator is incapable of using an internal micrometer for determining the internal diameter of the cylinder, after the same has been in use for some length of time, so that new piston rings may be fitted. Even those capable of using a device of this nature are quite often incapable of correctly reading the same. Further, when able to read the micrometer mechanics are often handicapped for the reason that they cannot express a difference in dimension of .002" upon paper.

I have now constructed a simple form of gauge which is particularly intended for use in connection with determining the internal diameter of cylinders in internal-combustion engines, but which is not necessarily limited to this use, as the same might well be utilized for any internal reading. The gauge will be so constructed as to be readily capable of being utilized by any internal-combustion engine user or mechanic, having in mind the utmost simplicity of construction as well as ease and exactness of reading.

Reference is had to the attached sheet of drawings which illustrates one practical embodiment of my invention, and in which—

Figure 1:
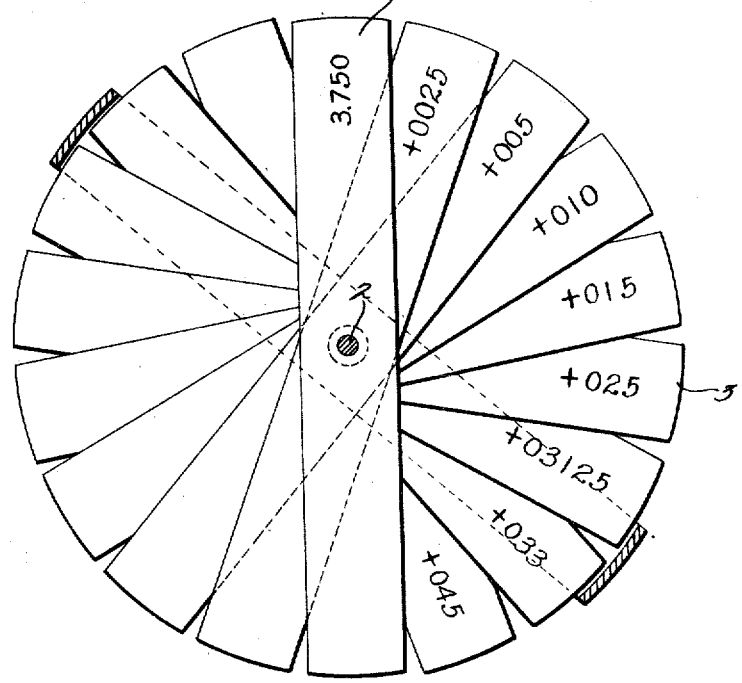
Figure 2:

Figure 1 is a partly sectional plan view of a gauge constructed in accordance with my invention, and Figure 2 is a side view thereof.

In both these views like reference numerals designate similar parts, and the reference numeral 1 indicates a series of gauge blades pivotally secured together by any suitable means, as at 2, each succeeding blade being of increased length, such as, for instance, .005" oversize as compared to the preceding blade and having this difference plainly printed upon its face.

Any suitable number of gauge blades may be grouped together, and the same may be of any desired length, so that an unlimited scope of readings may be obtainable.

The blades 1 and pivots 2 are carried by a cage 4 which may consist of strips of equal or slightly greater widths than the blades 1, which strips 4 extend beyond the ends of such blades, and are connected together by means of end walls so that the gauge may be folded and afforded protection from mutilation.

It will now be appreciated that the approximate size of the cylinder may be guessed and a corresponding gauge blade chosen, the balance of the blades being held at right angles to the blade in use. Now, upon passing the gauge into the interior of a cylinder and holding the blade in use at right angles to the longitudinal axis of the same, the balance of the blade being parallel to this line, it will be seen that one blade after another may be chosen until the correct diameter of the cylinder has been ascertained by means of a blade which snugly engages the inner face of the cylinder with both of its ends and extends from one point in the cylinder to a point diametrically opposite thereto.

It will now be understood that the blade being used to ascertain the diameter of the cylinder might be held in a position transversely to the longitudinal axis of the cylinder, so that a true reading would not be had. Further, if too large a blade were inserted and forced into the position desired a jamming might result, and with this in mind I have rounded, as at 3, the ends of each gauge blade in the form of an arc which is part of a true circle, thus permitting of a slight variation from the true horizontal, as well as eliminating danger of jamming.

Obviously, numerous modifications might readily be resorted to without in the least departing from the scope of my claim.

I claim:

A gauge for measuring cylindrical bores comprising a plurality of blades having rounded ends to conform to the rounded walls of various bores to be measured and having indications relating to the diameter of each bore, a common pivot upon which all of the blades are mounted, and a cage carrying the pivot in which cage the blades may be housed.

EDGAR ARTHUR FRANCIS.